(12) United States Patent
Montgomery (10) Patent No.: US 7,118,436 B2
(45) Date of Patent: Oct. 10, 2006

(54) PERSONAL WATERCRAFT FUEL TANK ASSEMBLY

(76) Inventor: Robert E. Montgomery, 1000 Calle Amanecer, San Clemente, CA (US) 92673

( * ) Notice: Subject to any disclaimer, the term of this patent is extended or adjusted under 35 U.S.C. 154(b) by 0 days.

(21) Appl. No.: 11/015,291

(22) Filed: Dec. 17, 2004

(65) Prior Publication Data

US 2005/0239353 A1      Oct. 27, 2005

Related U.S. Application Data

(60) Provisional application No. 60/530,583, filed on Dec. 17, 2003.

(51) Int. Cl.
*F02B 61/04*        (2006.01)

(52) U.S. Cl. ..................................... 440/88 F

(58) Field of Classification Search .............. 440/88 R, 440/88 F
See application file for complete search history.

(56) References Cited

U.S. PATENT DOCUMENTS

| | | | | |
|---|---|---|---|---|
| 4,926,773 A | * | 5/1990 | Manor | 114/280 |
| 5,582,529 A | * | 12/1996 | Montgomery | 441/74 |
| 6,457,433 B1 | * | 10/2002 | Nagata | 114/343 |

* cited by examiner

*Primary Examiner*—Ed Swinehart
(74) *Attorney, Agent, or Firm*—Lynn & Lynn (57) ABSTRACT

A fuel tank assembly is formed to fit within a personal watercraft hull that includes a cavity therein having curved sidewalls. A main fuel tank is formed as an elongate container that has a front section, a rear section and a central section. The central section is formed to have elasticity so that it can deform to conform to a sidewall portion of the cavity and exert an elastic force on the cavity sidewall sufficient to retain the main fuel tank inside the cavity

3 Claims, 10 Drawing Sheets

PERSONAL WATERCRAFT FUEL TANK ASSEMBLY

CROSS REFERENCE TO RELATED APPLICATION

Applicant claims priority based on Provisional Application No. 60/530,583, filed Dec. 17, 2003.

BACKGROUND OF THE INVENTION

This invention is directed generally to personal watercraft and particularly to a fuel tank assembly for a personal watercraft.

There are considerable difficulties associated with providing a satisfactory fuel tank for personal watercraft. The fuel must be kept free of contamination by water and other debris while still having an adequate vent system. In small personal watercraft where only a small amount of space is available, there are problems in installing a fuel tank having a capacity that is satisfactory to most users. Another difficulty with previous systems is inadequate leakage or spillage protection.

SUMMARY OF THE INVENTION

The present invention provides a unique fuel tank assembly that overcomes problems with previously known fuel tanks.

The fuel tank assembly according to the invention has a deck-mounted plastic filler pipe. A fuel line having an inside diameter of about 50 mm direct incoming fuel into a 2.5 gallon plastic fuel tank that is located in the rear portion of the personal watercraft. The fuel tank incorporates a vent system that comprises two one-way check valves that allows air to enter and exit the fuel tank. The fuel tank assembly prevents the fuel pump from vacuum-locking the fuel tank and also prevents internal pressure build up.

Positive pressure is avoided by incorporating an air space within the fuel tank above the fuel inlet duct. The volume of the air space preferably is about 10% of the total volume of the fuel tank. In addition the filler line has a diameter designed to be large enough to allow venting during the refill process. The fuel tank assembly is designed to permit the tank to be inverted during engine operation without fuel leakage occurring. The fuel tank assembly also includes a second pickup tube positioned over the main pickup tube, which allows for a reserve fuel tank allocation of about 24% of the total fuel capacity.

A diaphragm fuel pump withdraws fuel from the tank through a fuel shutoff valve that may be manually operated. This valve is a three-way valve is located adjacent the deck-mounted filler inlet.

Following the fuel shutoff valves, fuel is pumped through a plastic in-line filter into the fuel pump, which preferably is crankcase-pulse operated. The pump is an integral component of a single downdraft single-Venturi floatless carburetor. The vacuum-actuated diaphragm operates only when crankcase pulses exist, which is during engine operation, and pumps fuel directly into the carburetor prior to atomization. Any unused fuel is returned under a positive pressure (preferably less than 2 psi) to the front reserve tank. This system eliminates the need for a float bowl.

DETAILED DESCRIPTION OF THE INVENTION

Figure 1:
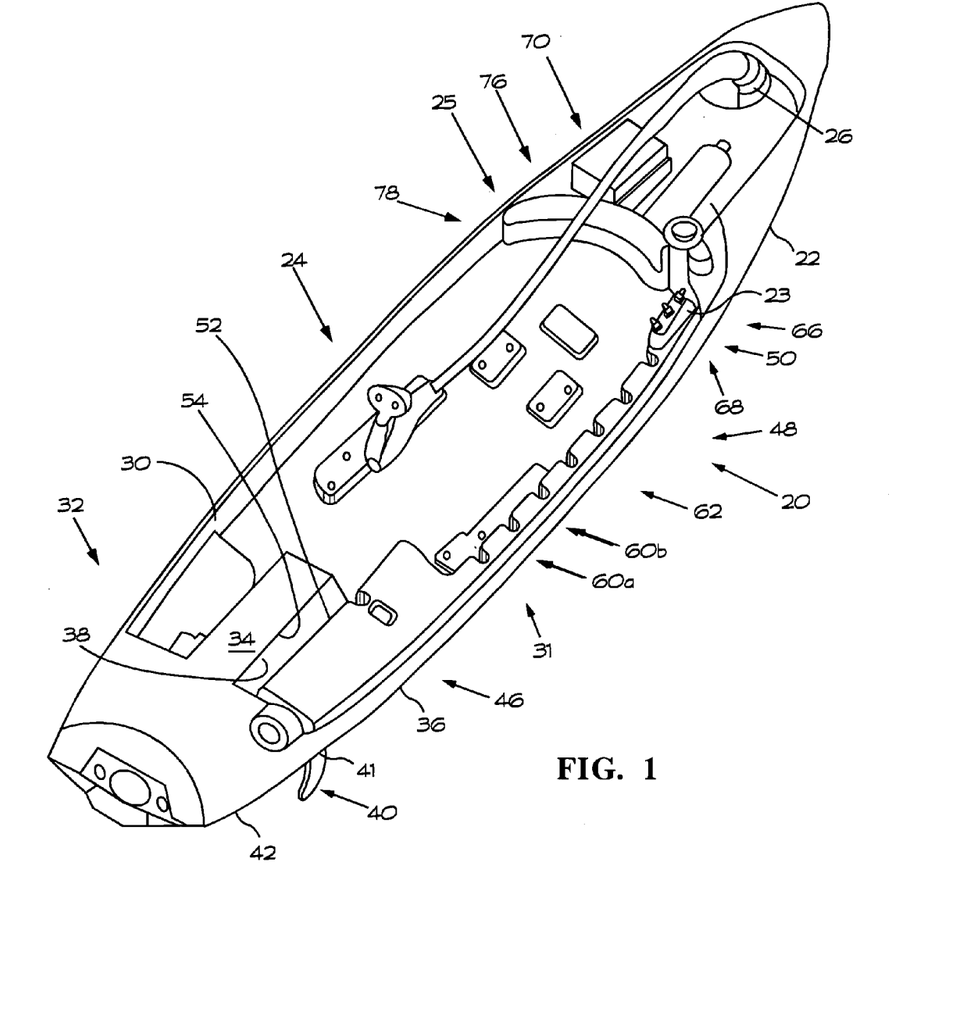
FIG. 1 is a perspective view of a portion of a personal watercraft showing a hull and a fuel tank assembly according to the invention mounted in the hull.
Figure 2:
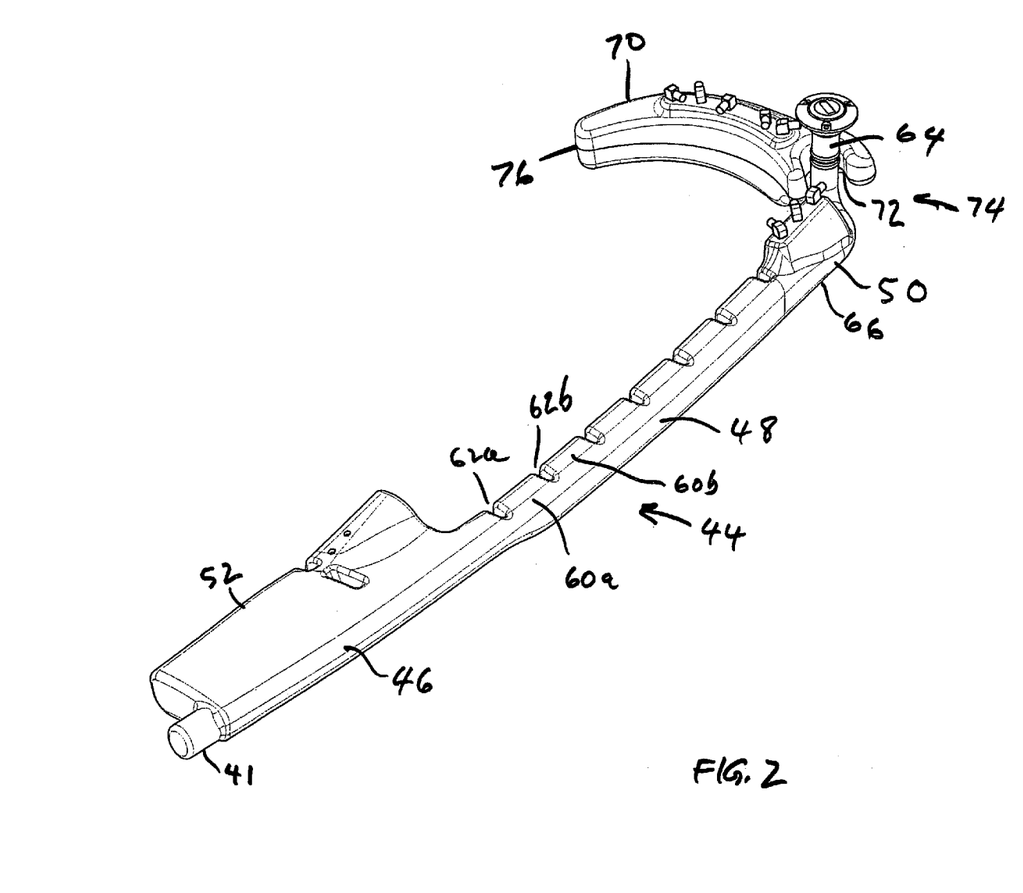
FIG. 2 is a perspective view of the fuel tank of FIG. 1.
Figure 3:
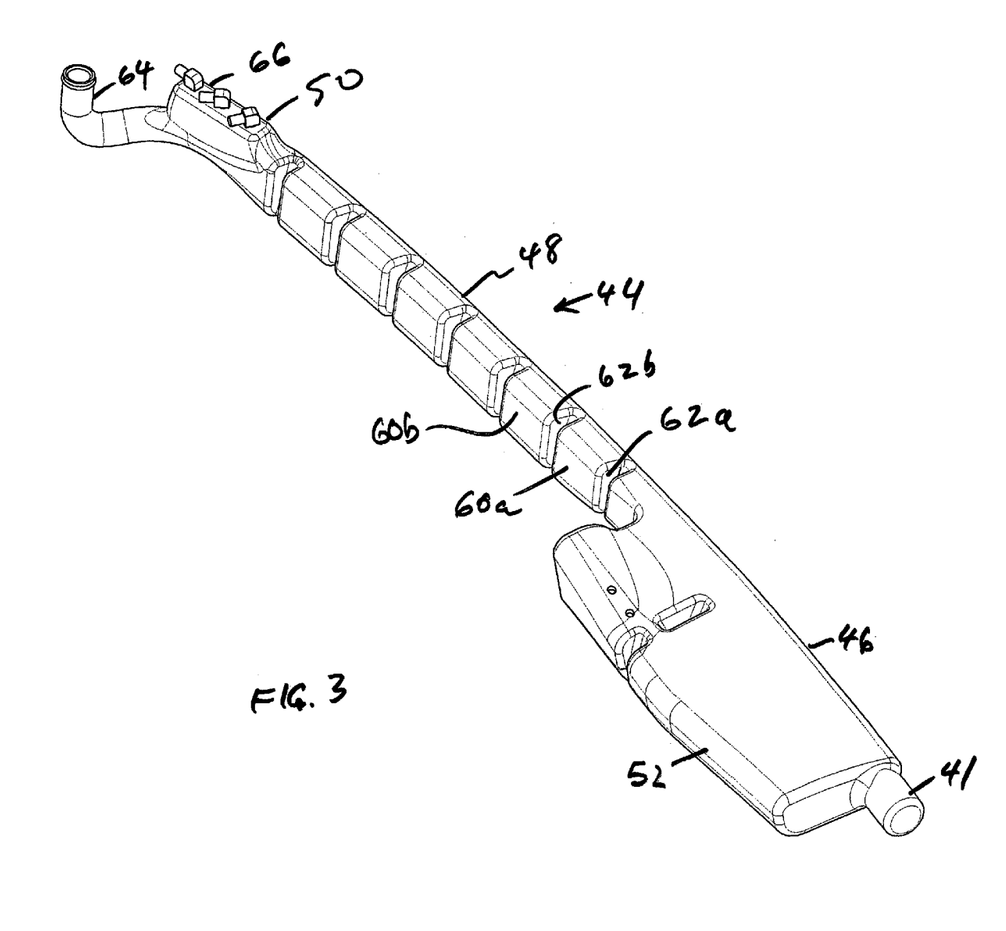
FIG. 3 is a left rear perspective view of a main fuel tank included in the fuel tank assembly of FIGS. 1 and 2.
Figure 4:
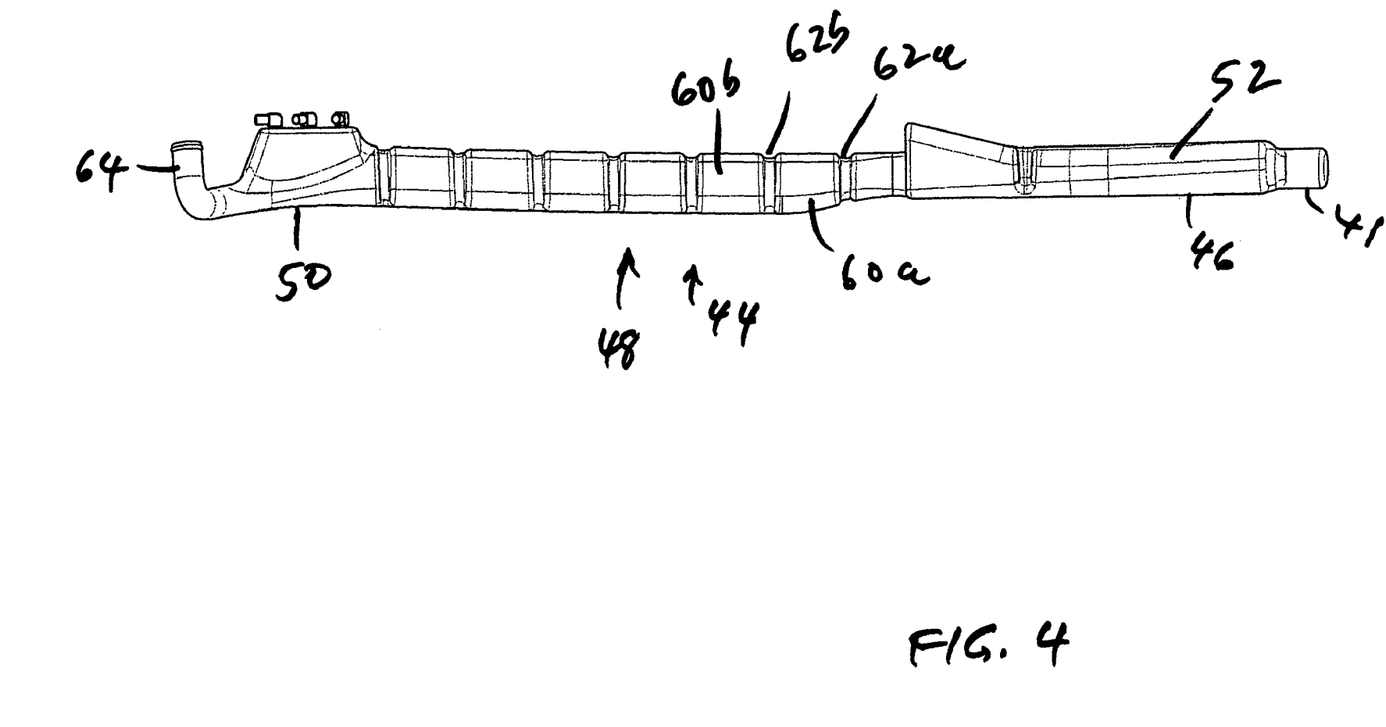
FIG. 4 is a left side elevation view of the apparatus of FIG. 3.
Figure 5:
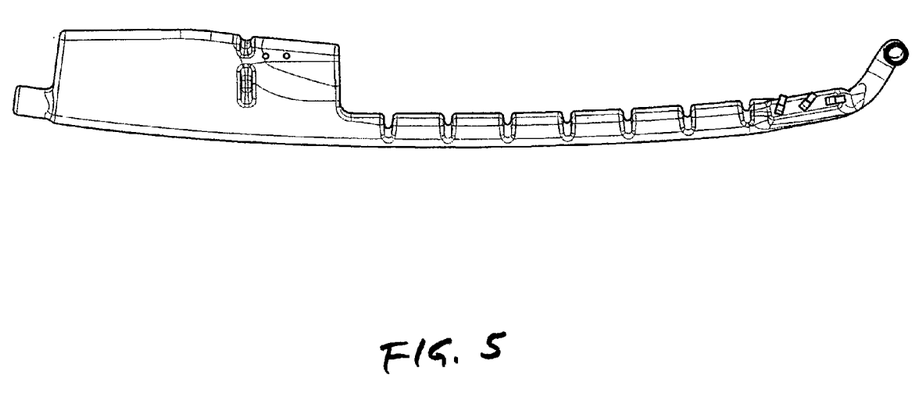
FIG. 5 is a top plan view of the apparatus of FIG. 3.
Figure 6:
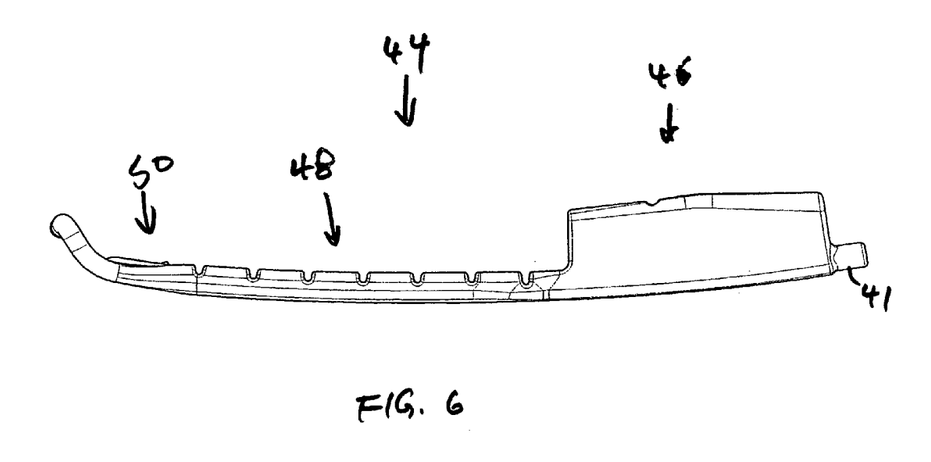
FIG. 6 is a bottom plan view of the apparatus of FIG. 3.
Figure 7:
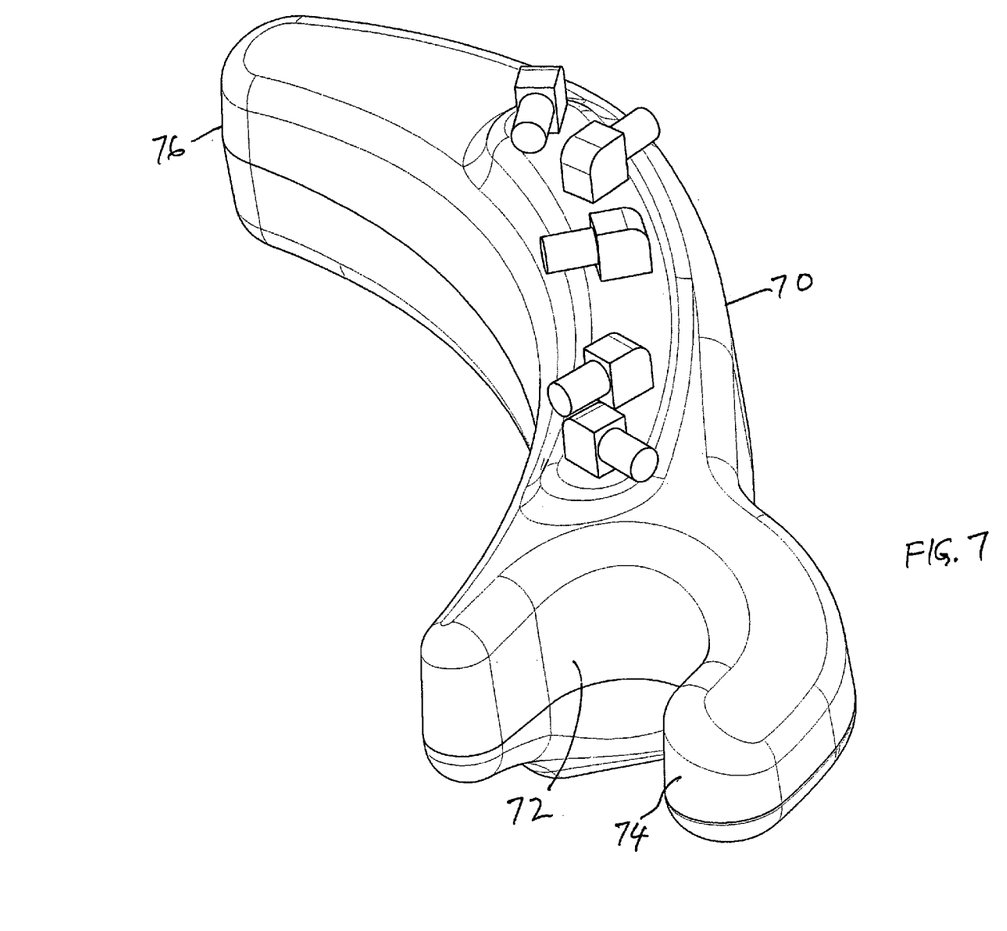
FIG. 7 is a first perspective view of an auxiliary fuel tank that may be included in the fuel tank assembly of FIGS. 1 and 2
Figure 8:
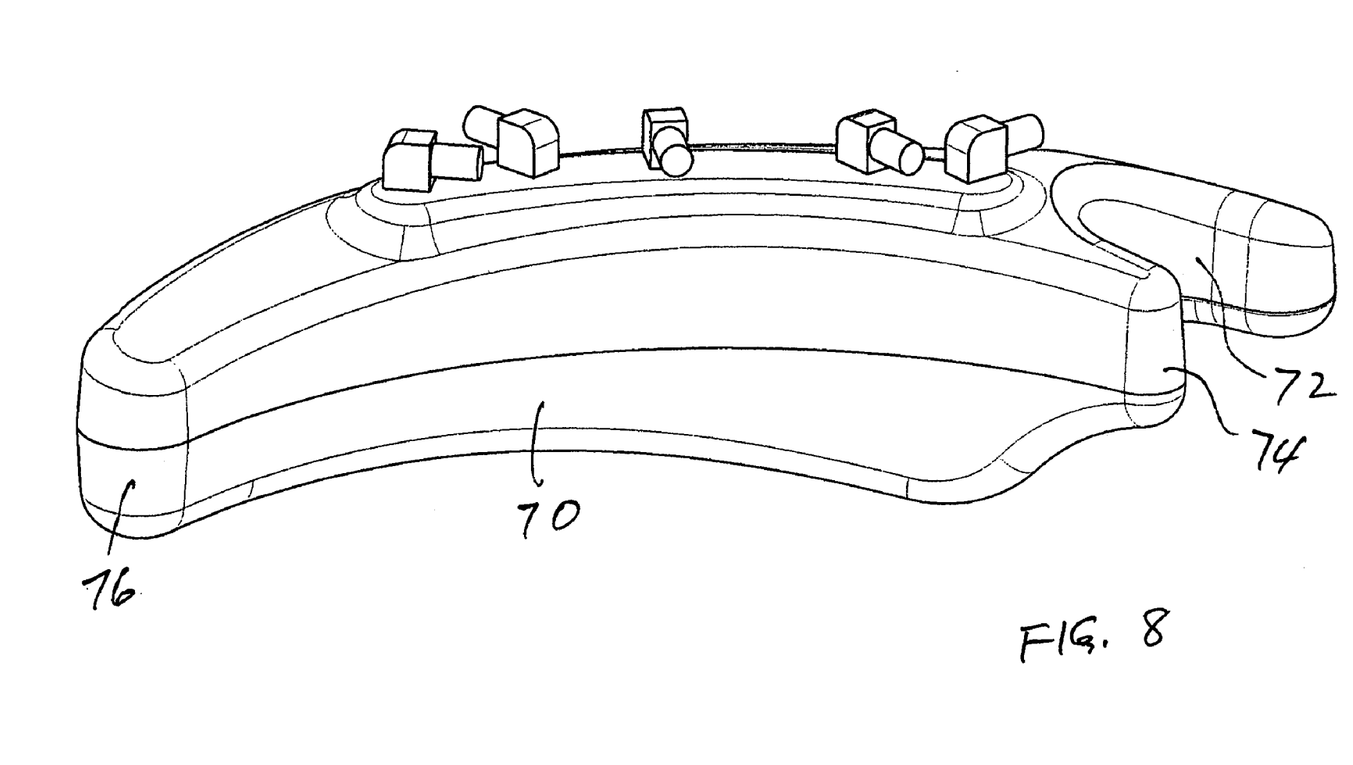
FIG. 8 is a second perspective view of the apparatus of FIG. 7.
Figure 9:
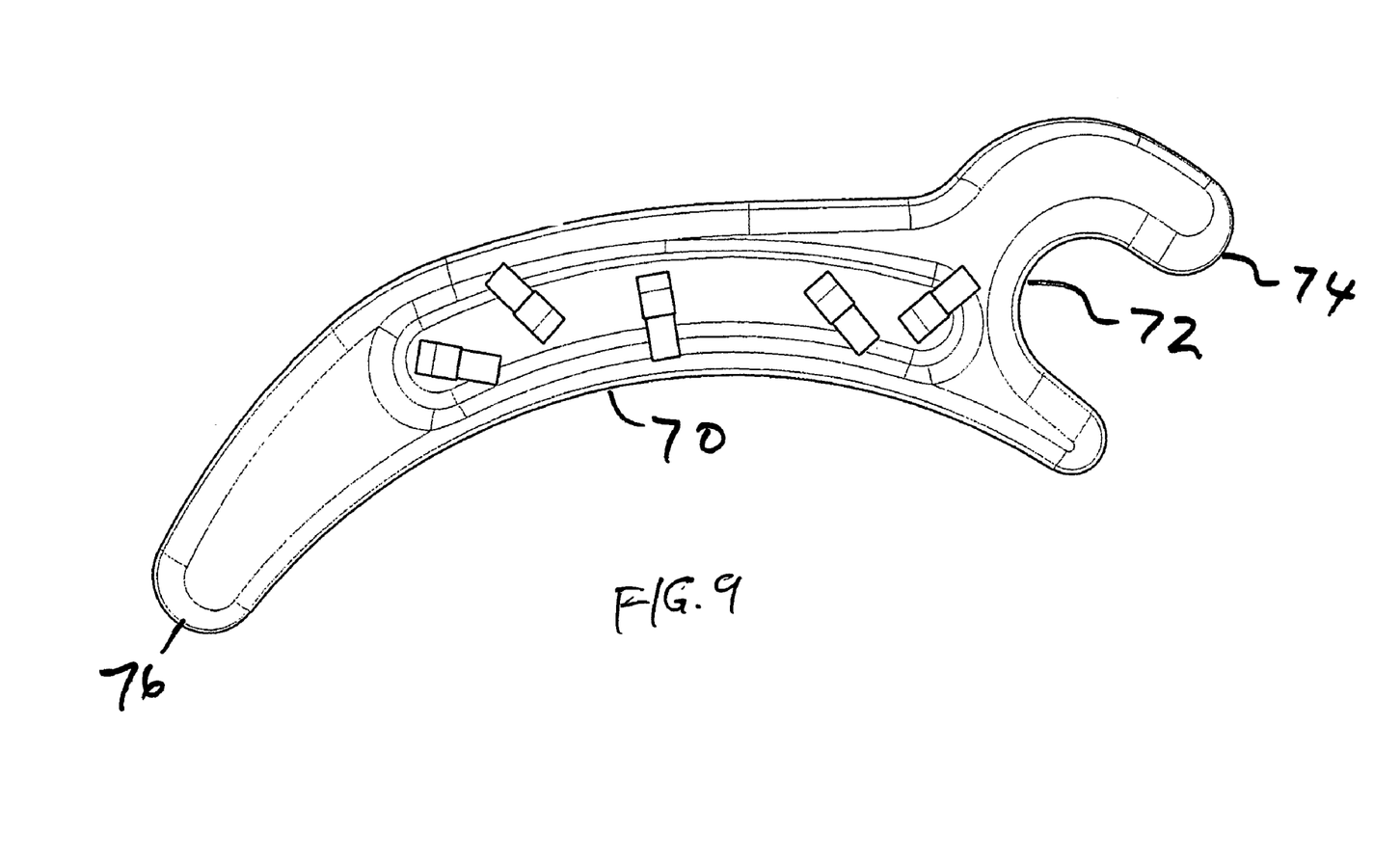
FIG. 9 is a top plan view of the apparatus of FIG. 7.
Figure 10:
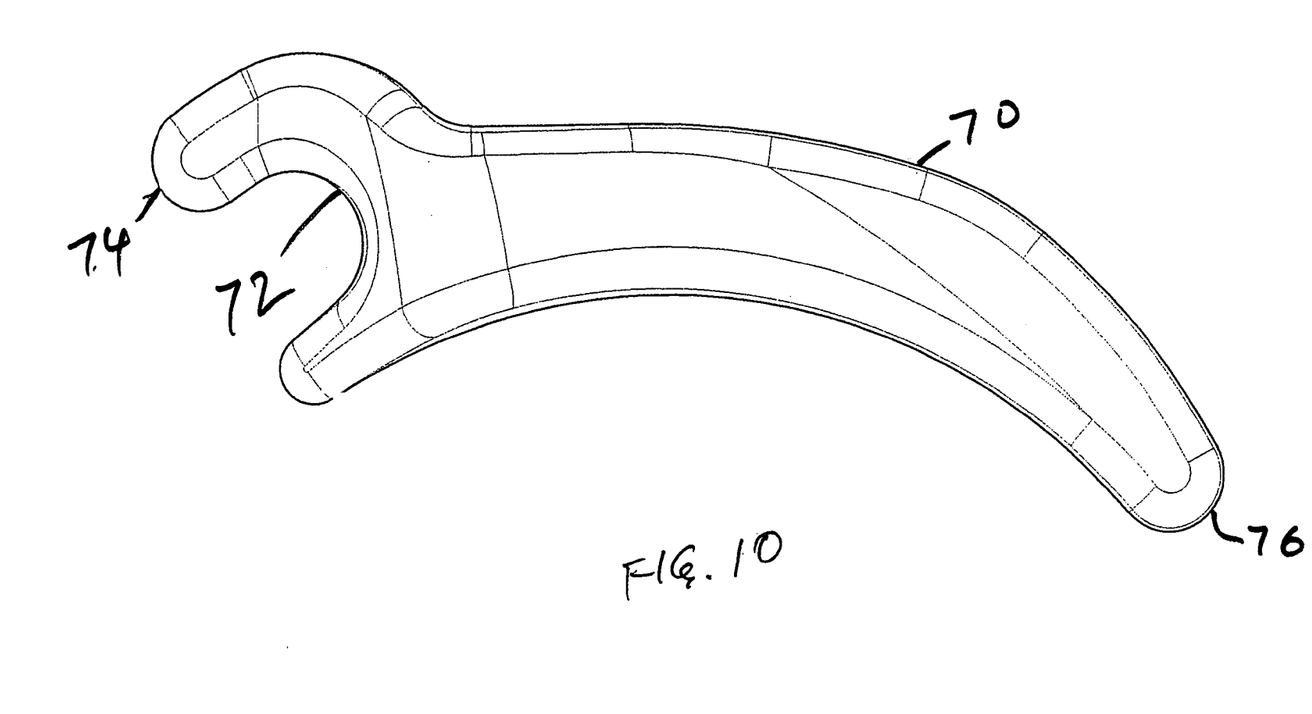
FIG. 10 is a bottom plan view of the apparatus of FIG. 7.

A personalized watercraft 20 includes a hull 22 with an engine (not shown), an exhaust system (not shown) and a fuel tank assembly 23. A person using the personalized watercraft 20 typically stands on a deck portion near its center and controls it by means of a control handle 24. The operating handle 24 is connected to the hull 22 by means of an arm pole 25 that is connected to an air intake assembly 26.

The hull 22 may be formed by molding any suitable material such as fiberglass, plastic etc. The hull 22 is designed to have sufficient structural strength and rigidity to support the weight of the engine, other internal components and a person standing on the deck.

The hull 22 includes a cavity 30 in which the fuel tank assembly 31, the engine, the exhaust system and other components are mounted. The cavity 30 is defined by the upper side of the hull bottom and the right and left sidewalls of the hull 22. The hull bottom has an essentially a smooth slightly curved upper surface except at locations where mounting pads for mounting internal components are formed. The sidewalls are concavely curved so that the center of the cavity 30 is wider than its front and rear ends. The cavity 30 extends most of the width of the hull 22 in its central region.

In a rear central portion 32 of the hull 22 a projection 34 having a generally rectangular cross section extends into the cavity 30. The projection 34 serves as a housing for a drive shaft (not shown) and a jet pump (not shown). The projection 34 and the inner right sidewall 36 of the hull 22 cooperate to form a cavity 38 whose front end is contiguous with the cavity 30.

A recess 40 is formed at a rear end portion 42 of the hull 22. The recess 40 has a front opening that is contiguous with the cavity 38. When the main fuel tank 44 is mounted in the hull 22, a projection 41 extends from the rearmost portion of the main fuel tank 44 into the recess 40.

The fuel tank assembly 31 includes a main fuel tank 44 is formed as an elongate container that extends most of the combined length of the cavities 30 and 38. The main fuel tank 44 has a rear section 46, a central section 48 and a front section 50. The rear section 46 may be wider than the central section 48 and the front section 50. The rear section 46 essentially fills the cavity 38 so that a left side portion 52 of the rear section is adjacent a side portion 54 of the projection 34. The rear section 46 may extend beyond the front end of the projection 34.

The central section 48 is formed to be flexible so that it can be deformed to conform to the curved shape of the right inner sidewall of the hull 22. A preferred means of providing the desired flexibility is to form the central section as a plurality of segments 60a, 60b, etc. The segments 60a, 60b, etc. are serially connected by narrower portions 62a, 62b, etc. that cooperate with the segments 60a, 60b, etc. to form a rib-like configuration. The wider segments 60a, 60b, etc. are essentially rigid, but the central portion 48 will flex in a horizontal plane at the narrower portions 62a, 62b, etc. upon application of sufficient force. The front section 50 contains a filler pipe 64 and fittings for tubing etc. (not shown) for delivering fuel from the main fuel tank 44 to the engine and for allowing entry of air as fuel leaves the main fuel tank.

The flexibility feature of the main fuel tank 44 is used to mount it in the hull 22. A mounting procedure could first include inserting the projection 41 into the recess 40 and inserting the rear portion of the rear section 46 into the cavity 38 so that a right rear side portion is in contact with the inner sidewall of the hull 22. This retains the rear section in the hull so that a bending force may be applied to the fuel tank 44. A person (or a robot) may then grasp the front portion 50 and pull it into the cavity 30 so that a front side portion 66 of the main fuel tank 44 engages an inner sidewall portion 68 of the hull 22.

The filler pipe 64 is preferably attached to the front of the main fuel tank 44. An auxiliary fuel tank 70 is preferably mounted in a forward portion of the cavity 30. Whereas the main fuel tank 44 extends lengthwise on one side of the cavity 30, the auxiliary fuel tank 70 is mounted transversely in the cavity 30. The auxiliary fuel tank 70 has a recess 72 formed in a portion of an end wall 74. When the auxiliary fuel tank 70 is mounted in the cavity 30, the filler pipe 64 of the main fuel tank 44 fits within the recess 72. The auxiliary fuel tank 70 is configured such that a left end 76 thereof is urged against a portion 78 of the left sidewall of the cavity 30 by elastic forces. Therefore, is should be seen that the filler pipe 64 and the left sidewall of the cavity 30 retain the auxiliary fuel tank 70 in the desired position in the cavity 30.

The main fuel tank 44 and the auxiliary fuel tank 70 may be formed of a durable plastic material that has sufficient elasticity to retain them in the cavity 30 in the hull 22.

What is claimed is:

1. A fuel tank assembly formed to fit within a personal watercraft hull that includes a cavity therein having curved sidewalls, comprising:

a main fuel tank formed as an elongate container, the main fuel tank having a front section, a rear section and a central section, the front section having a front end formed to engage a first inner wall portion of the hull, the rear section having a rear end formed to engage a second inner wall portion of the hull, the central section being formed to include a plurality of essentially rigid segments serially connected together by a plurality of flexible portions that provide elasticity so that the central section can deform to conform to a sidewall portion of the cavity and exert an elastic force between the front section and the first wall portion and between the rear section and the second wall portion sufficient to retain the main fuel tank inside the cavity.

2. The fuel tank assembly of claim 1 wherein the hull has a recess in the rear wall portion and the wherein the rear section has a projection formed to extend into the recess to retain the rear section in the hull.

3. The fuel tank assembly of claim 1, further including an auxiliary fuel tank having a first end portion with a recess therein, the main fuel tank having a filler pipe arranged to extend into the recess while elastic forces urge a second end portion of the auxiliary fuel tank against a sidewall portion of the cavity in the hull to retain the auxiliary fuel tank in a selected position in the cavity.

* * * * *